Sept. 13, 1949.  W. H. FUSS  2,481,993
ELECTRONIC GAUGE
Filed May 19, 1947
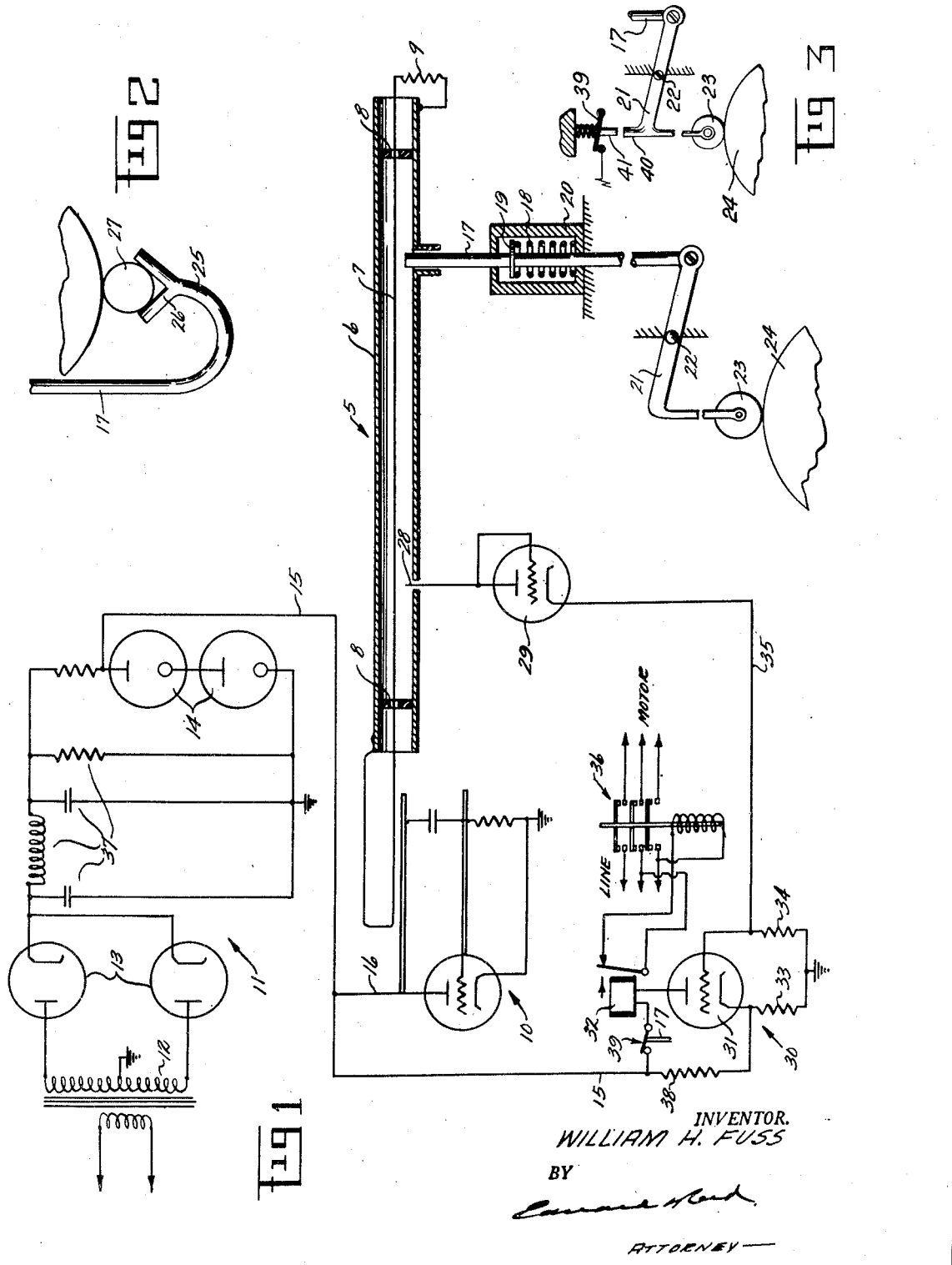
INVENTOR.
WILLIAM H. FUSS
BY
ATTORNEY Patented Sept. 13, 1949

2,481,993

UNITED STATES PATENT OFFICE 2,481,993

ELECTRONIC GAUGE

William H. Fuss, Osborn, Ohio

Application May 19, 1947, Serial No. 749,110

4 Claims. (Cl. 175—320)

This invention relates to an electronic gauge for determining the dimension of a part to be gauged.

One object of the invention is to provide a highly sensitive gauge which is extremely accurate in operation.

A further object of the invention is to provide such a gauge which is wholly automatic in operation.

A further object of the invention is to provide such a gauge which will automatically interrupt the operation of a machine on a work piece when a dimension of the work piece has been reduced to a predetermined size.

A further object of the invention is to provide such a gauge in which the magnitude of voltage standing waves is controlled by the dimension of a work piece and a device to be operated is actuated when said voltage standing waves attain a predetermined value.

Other objects of the invention may appear as the apparatus is described in detail.

In the accompanying drawing Fig. 1 is a schematic view of an apparatus embodying the invention, partly in section; Fig. 2 is a detail view of a modified form of a work engaging member; and Fig. 3 is a detail view of a switch opening device.

In this drawing I have illustrated one embodiment of the invention and have shown the same in an apparatus designed primarily for controlling the operation of a machine on a work piece, but it is to be understood that the apparatus as a whole, as well as the several parts thereof, may take various forms and may be used for various purposes without departing from the spirit of the invention.

The apparatus comprises a transmission line which includes parallel conductors and is substantially free from reflections, means controlled by a part to be gauged to create voltage standing waves in said line and means energized by said standing wave voltage when said waves attain a predetermined value to actuate a part to be operated.

In the particular apparatus here illustrated the transmission line is a concentric line 5, including an outer tubular conductor 6 and an inner tubular conductor 7 spaced from the outer conductor by insulating members 8. The concentric line terminates in an impedance, preferably of pure resistance as shown at 9, substantially equal to its characteristic impedance, and it is, therefore, substantially free from reflection and normally no voltage standing waves are created therein.

High frequency electric energy, preferably at ultra high or super high radio frequency, may be supplied to the concentric line in any suitable manner, as by an oscillator 10. The oscillator may be of any suitable type capable of oscillating at the desired high frequency and may be connected with the concentric line in any suitable manner, such as inductive or capacitive coupling. In the present instance the oscillator is of the Lecher line type and oscillates at about 750 megacycles per second and is inductively connected with the concentric line.

A constant direct current voltage may be supplied to the oscillator from any suitable source but preferably means are provided for rectifying commercial alternating voltage to a constant direct current voltage of the proper value. The voltage supply unit 11 as here shown is of a known type and comprises a transformer 12 adapted to be connected in a 110 volt, 60 cycle, standard commercial supply line. Connected with the transformer are rectifier tubes 13 and connected with the rectifier tubes through a filter 31 are regulator tubes 14. By this means a direct current voltage of constant value is supplied to the oscillator by conductors 15 and 16 connected with the plate circuit of the oscillator.

As has been stated the concentric line 5 is normally substantially free from voltage standing waves and means are provided for creating voltage standing waves in the concentric line. The means for creating voltage standing waves is controlled by the part being gauged and is of such a character that the magnitude of waves in the concentric line will increase progressively as the dimension of the part being gauged decreases. In the present arrangement the means for creating the voltage standing waves comprises a rod 17 adapted to be inserted in the tubular conductor 6 and to be moved toward the inner conductor 7 progressively as the dimension of the work piece decreases thus unbalancing the impedance match of line 5. Any suitable means may be provided for so controlling the movement of the rod by the work piece. In the present arrangement the rod is urged constantly toward the inner conductor by a spring 18 which is confined between a stop 19 on the rod and a fixed part, such as the bottom wall of a housing 20 through which the rod extends. Connected with the outer end of the rod is a part adapted to engage the work piece and so resist the movement of the rod by the spring that the movement of the rod will be in direct proportion to the decreased dimension of the work piece. In Fig. 1 a lever 21 pivoted on a fixed support at 22 is connected at one end with the rod and carries at its other end a part such as a roller 23 which rests upon the surface of the work piece 24 which may be either curved or flat. In Fig. 2 the outer end portion of the rod 17 has an inwardly extending portion 25 the inner end of which is forked at 26 to embrace a rotatable work piece 27 and thus control the movement of the rod toward the inner conductor.

As the rod closely approaches the inner conductor the voltage standing waves increase in magnitude very rapidly for each increment of rod movement. Means are provided for picking up the standing wave voltage and converting the same into direct current voltage which is utilized for controlling a part to be operated. In the present arrangement a probe 28 extends into the tubular conductor, preferably at a point of maximum standing waves, and picks up the standing wave voltage and feeds the same to a detector which converts standing wave voltage into direct current voltage. In the arrangement shown a vacuum tube detector 29 is employed, the cathode of which is connected to a device which amplifies the direct current voltage delivered by the detector and delivers that voltage to a relay which will be energized when the standing wave voltage in the concentric line attains a predetermined value.

In the present arrangement the amplifying means comprises a gas triode grid type tube circuit, 30, which includes a grid type gas triode tube 31, the plate circuit of which is connected with a relay 32. The cathode is connected with the direct current power supply 11 by the conductor 15 and with a voltage divider consisting of resistors 33 and 38 which normally cause the gas triode to be cut off. The grid circuit is connected to ground through a grid bias resistor 34. The cathode of the detector 29 is connected by a conductor 35 with the grid circuit of the gas triode. The adjustment and relation of the several parts of the gas triode are such that a positive voltage is impressed upon the cathode resistor 33 and prevents the energization of the relay 32, thus retaining the latter normally in its deenergized position. When the standing wave voltage in the concentric line attains a predetermined value the voltage from the detector applied across the resistor 34 fires the gas triode and energizes the relay. The closing of the relay controls the operation of the part to be actuated which is here shown as a magnetically operated switch 36. When the apparatus is used for controlling the operation of a machine on a work piece this switch may interrupt the operation of the motor and thus stop the machine, or it may control the operation of a device for withdrawing the work piece. A limit switch 39 in the plate circuit of the gas triode is operated when the rod 17 is disengaged from the work piece, thereby restoring the gas triode to its initial condition. This may be accomplished in any suitable manner, and in the arrangement shown in Fig. 3 that end portion of the lever 21 which carries the roller 23 is provided with a projection 40 arranged to engage the stem 41 of the switch 39 and open the latter when the end portion of the lever is lifted to disengage the roller from the work piece.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent is:

1. An electronic gauge comprising a transmission line including parallel conductors, terminating in its characteristic impedance and substantially free from reflections, means for supplying constant high frequency energy to said transmission line, means controlled by a part to be gauged to create voltage standing waves in said transmission line, means for converting said standing wave voltage into direct current voltage, a device to be operated, means including a relay for actuating said device, and means controlled by said direct current voltage for energizing said relay when said standing wave voltage is of a predetermined value.

2. An electronic gauge comprising a concentric line terminating in its characteristic impedance and substantially free from voltage reflections, means for supplying constant high frequency energy to said concentric line, means controlled by a dimension of a part to be gauged to create voltage standing waves in said concentric line, means for converting said standing wave voltage into direct current voltage, a device to be operated, means including a relay for actuating said device, and means controlled by said direct current voltage for energizing said relay when said standing wave voltage is of a predetermined value.

3. An electronic gauge comprising a concentric line including inner and outer conductors spaced one from the other and having its characteristic impedance connected across said conductors, means for supplying constant high frequency energy to said concentric line, a device adapted to be inserted into the space between said conductors to create voltage standing waves therein, means controlled by a part to be gauged for inserting said device in said outer conductor a distance determined by a dimension of said part, a device to be operated, means including a relay to control the operation of said device, and a detector connected with said concentric line to pick up said voltage standing waves and deliver direct current to said relay.

4. An electronic gauge comprising a concentric line including inner and outer conductors spaced one from the other and having its characteristic impedance connected across said conductors, means for supplying constant radio frequency energy to said concentric line, a device adapted to be inserted into the space between said conductors to create voltage standing waves therein, means controlled by a part to be gauged for inserting said device in said outer conductor a distance determined by a dimension of said part, a device to be operated, means including a gas triode, grid type for actuating said device, and a detector connected with said concentric line to pick up said voltage standing waves and impress a direct current voltage on the grid bias resistor of said gas triode.

WILLIAM H. FUSS.

REFERENCES CITED

The following references are of record in the file of this patent:

UNITED STATES PATENTS

| Number | Name | Date |
|---|---|---|
| 1,077,818 | Eagar | Nov. 4, 1913 |
| 1,992,027 | Green | Feb. 19, 1935 |
| 2,179,517 | Pelosi | Nov. 14, 1939 |
| 2,267,559 | Foster | Dec. 23, 1941 |
| 2,428,272 | Evans | Sept. 30, 1947 |
| 2,437,085 | Evans | Mar. 2, 1948 |